United States Patent [19]

Smyrni et al.

[11] 4,018,538
[45] Apr. 19, 1977

[54] CROSS ARM HANGER SUPPORT

[75] Inventors: Emanuel S. Smyrni; Bobbie L. White, both of Shreveport, La.

[73] Assignee: Gym-Dandy, Inc., Bossier City, La.

[22] Filed: June 17, 1975

[21] Appl. No.: 587,798

[52] U.S. Cl. .............................. 403/346; 403/362; 403/375; 272/85

[51] Int. Cl.² ...................... F16D 1/00; B25G 3/00

[58] Field of Search .......... 403/362, 346, 347, 375, 403/382, 398, 399, 400, 403; 248/370; 272/85, 86, 87, 88, 89, 90, 91, 92

[56] References Cited

UNITED STATES PATENTS

| 2,711,917 | 6/1955 | Blu | 403/218 UX |
| 2,818,289 | 12/1957 | Horowitz | 403/218 UX |
| 3,145,013 | 8/1964 | Grudowski | 248/370 |
| 3,503,582 | 3/1970 | Boucher | 248/370 |

*Primary Examiner*—Wayne L. Shedd
*Attorney, Agent, or Firm*—Seidel, Gonda & Goldhammer

[57] ABSTRACT

A cross arm hanger support is disclosed and adapted to be attached to a gym set pipe of 2 inch OD or 2½ OD for suspending therefrom a hanger for a swing glider, pendulum seesaw, lawn glider, and the like. The support includes a cross arm and a clamp each of which have at least one set screw to prevent rotation of the support relative to the pipe. The cross arm is slit to provide for expansion of the same when it is applied to a 2½ inch OD pipe.

6 Claims, 5 Drawing Figures

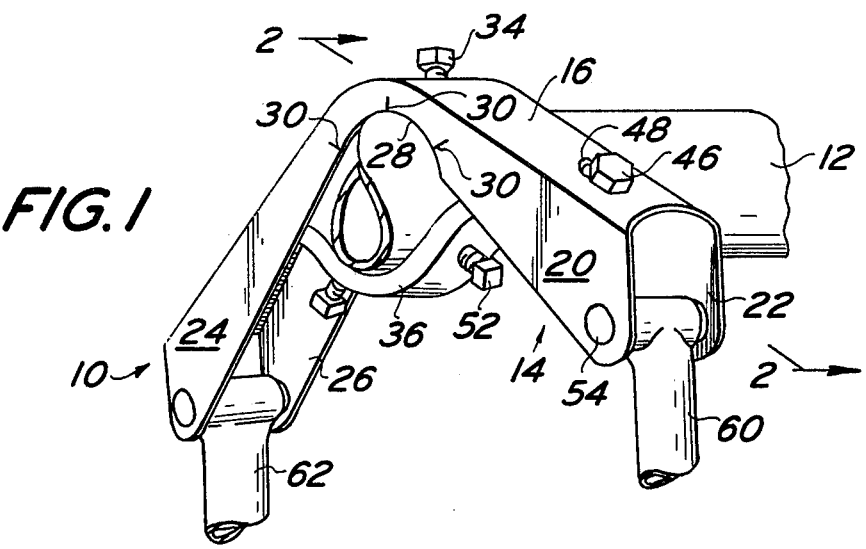

CROSS ARM HANGER SUPPORT

The cross arm hanger support of the present invention is adapted to be attached to a horizontally disposed pipe of a gym set. The support includes a cross arm having portions which converge upwardly to an apex. The cross arm is generally semi-circular at its lower edge adjacent the apex. Each of the converging portions of said cross arm includes a top wall having an elongated hole therein.

The support includes a clamp having a flange at each end of a centrally disposed arcuate portion. Each flange is generally perpendicular to one of the top walls of the cross arm. Each flange has a hole aligned with one of the elongated holes in said top walls.

At least one set screw is supported by the clamp. A set screw is supported by the cross arm adjacent the apex thereof. The set screws are adapted to contact the OD of the pipe to prevent relative rotation of the arm or clamp with respect to the pipe.

It is an object of the present invention to provide a cross arm hanger support which may be applied to the pipe of any gym set wherein the pipe has a OD of between 2 and 2½ inches.

It is another object of the present invention to provide a cross arm hanger support for attachment to a gym set pipe having a 2 inch diameter while being capable of expansion so as to be attachable to pipes having a larger OD up to 2½ inches.

It is another object of the present invention to provide a cross arm hanger support structurally interrelated in a manner whereby it may be rapidly attached to a horizontally disposed pipe of a gym set in a manner which prevents relative rotation with respect to the pipe when a hanger rotatably supported thereby is subjected to normal loads.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a partial perspective view of a gym set pipe to which is attached the cross arm hanger support of the present invention.

FIG. 2 is a sectional view taken along the line 2—2 in FIG. 1 but on an enlarged scale.

Figure 3:
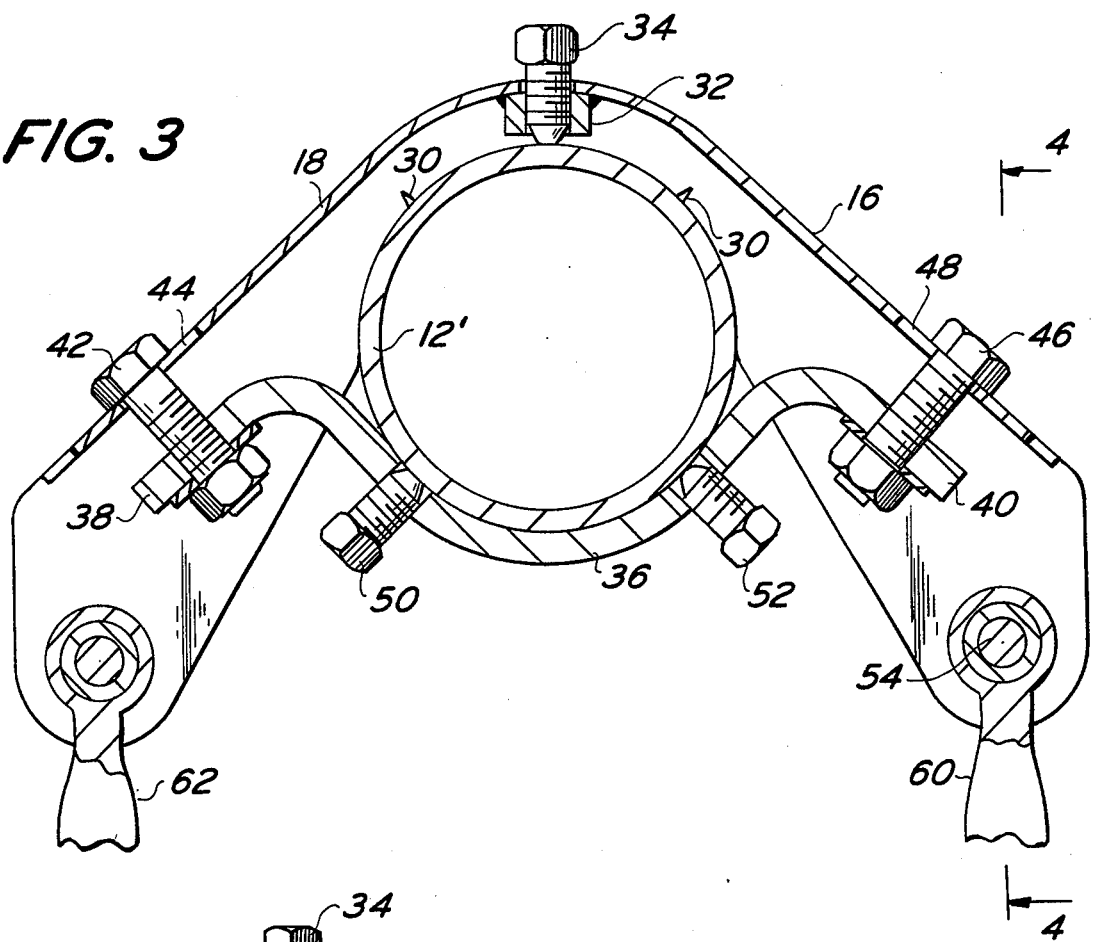
FIG. 3 is a view similar to FIG. 2 but showing the hanger support of FIG. 1 attached to a pipe of a larger diameter than that shown in FIG. 2.

Referring to the drawing in detail, wherein like numerals indicate like elements, there is shown in FIG. 1 a cross arm hanger support designated generally as 10 and attached to a horizontally disposed pipe 12 of a gym set. In FIGS. 1 and 2, the pipe 12 has a OD of 2 inches.

The support 10 includes a cross arm designated generally as 14. The cross arm 14 includes upwardly converging portions including top wall portion 16 and top wall portion 18 which forms substantially a right angle and meet at the apex. The top wall portion 16 is provided with side flanges 20 and 22. The top wall portion 18 is provided with side flanges 24 and 26.

The lower edge of the side flanges 20–26 form an acute angle smaller than a right angle and terminate at their upper ends in a generally semicircular arcuate edge 28. Edge 28, as shown more clearly in FIG. 2, extends through an arc of approximately 195° with a 1 inch radius. The arcuate edge 28 is provided with three radial slits 30.

One of the radial slits 30 is at the apex of the cross arm 14. Each of the other slits 30 is arcuately spaced from said apex slit by a distance of about 45°. Each of the slits 30 has a length of about 3/16 of an inch. When the cross arm 14 is applied to a pipe 12 having a 2 inch OD, the slits 30 remain closed.

A nut 32 is fixedly secured to the apex of cross arm 14 on the lower surface thereof in alignment with a hole therein. A set screw 34 extends through the nut and is adapted to contact the OD of pipe 12. A clamp 36 cooperates with the cross arm 14. Clamp 36 includes flanges 38 and 40 which are generally perpendicular to one another and disposed at opposite ends of an arcuate portion.

Figure 4:
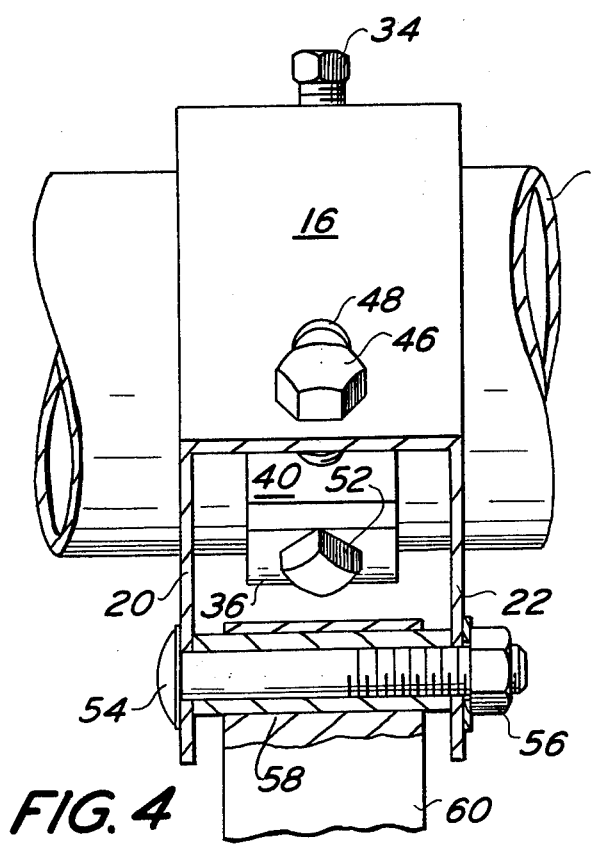
FIG. 4 is a sectional view taken along the line 4—4 in FIG. 3.

Flange 38 is generally parallel to top wall portion 18. Flange 40 is generally parallel to top wall portion 16. A bolt 42 extends through an elongated hole 44 in top wall 18 and through a hole in flange 38. A nut is secured to the bolt 42. Hole 44 is elongated in a direction extending along the length of the top wall 18. A bolt 46 extends through an elongated hole 48 in top wall 16 and through a hole in the flange 40. A nut is secured to the free end of bolt 46. Hole 48 is elongated in a direction corresponding to the length of wall 16. See FIG. 4.

At least one set screw is supported by the arcuate portion of clamp 36 for contact with the pipe 12. As shown in FIGS. 1 and 2, the clamp 36 is provided with a pair of set screws designated 50 and 52 arcuately spaced from one another by a distance of about 90°. The set screws 34, 50 and 52 are identical and contact the OD of pipe 12 at three locations to prevent relative rotation of the cross arm 14 and clamp 36 with respect to the pipe 12.

The free end of each portion of the cross arm 14 rotatably supports a hanger forming a part of a swing, glider, etc. One of the side walls such as side wall 20 has a rectangular opening therein aligned with a circular opening on the opposite wall 22. A carriage bolt 54 having a rectangular portion is disposed within the rectangular opening in side wall 20. The bolt 54 is of sufficient length so as to extend through the opening in wall 22 for receipt of a nut 56. See FIG. 4. The bolt 54 is preferably provided with a bearing sleeve 58 of a self lubricating plastic material. The bolt 54 and sleeve 58 extend through a circular opening at the upper end of the hanger 60. A hanger 62 is similarly supported from the free end of the opposite arm portion.

The support 10 is capable of being rapidly attached to the pipe 12 with minimum instructions and no specialized equipment. If the pipe to which the support 10 is to be attached has an OD of 2½ inches, the components of the support 10 will be as shown in FIG. 3. It will be noted that the slits 30 have expanded as shown in FIG. 3 so as to facilitate use of the support 10 on the larger diameter pipe 12'. The provision of three set screws on the cross arm and hanger has by test shown that the support 10 will not rotate relative to the pipe 12 or 12' under normal loads supported by the hangers 60 and 62. On the other hand, the use of only a single set screw such as set screw 34 has resulted in rotation of the support relative to the pipe with the hangers 60, 62 supporting a load of only 50 pounds.

The provision of elongated holes 44 and 48 enables the support 10 to be applied to pipes 12 and 12' without changing any of the other components. In this regard, compare the location of the bolts 42, 46 with respect to their elongated holes in FIG. 2 with that shown in FIG. 3.

Figure 5:
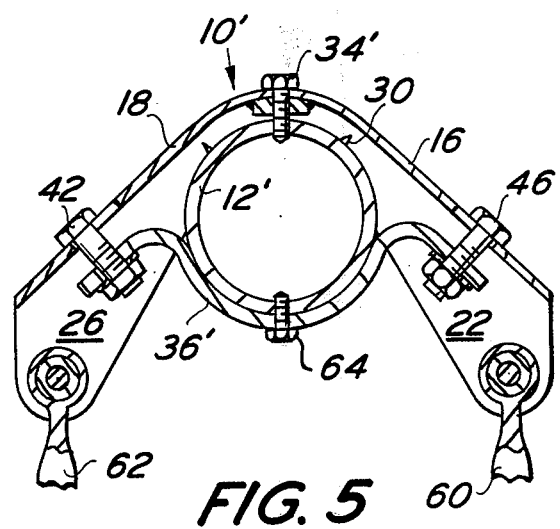
FIG. 5 is a view similar to FIG. 4 but on a smaller scale and with respect to a second embodiment of the present invention.

In FIG. 5, there is illustrated a support 10' in accordance with another embodiment of the present invention mounted on the 2½ inch diameter pipe 12'. The support 10' is identical with the support 10 except as will be made clear hereinafter.

In FIG. 5, the set screw 34' at the apex of the cross arm is of the self tapping type so that it taps into or through the wall of the pipe 12'. The clamp 36' is provided with a single set screw 64 which also is of the self tapping type so that it taps into or through the wall of the pipe 12'. When using self tapping set screws, only one such set screw is needed for the clamp 36'. It will be noted that the set screws 34' and 64 are diametrically opposite one another. Since the pipe 12' in FIG. 5 is a 2½ inch diameter pipe, the slits 30 are shown in their expanded condition. In all other respects, the support 10' is identical with the support 10.

Thus, it will be seen that the present invention provides a single hanger support capable of being applied to a gym set pipe having an OD of 2 inches to 2½ inches while being structurally interrelated in a manner so as to prevent relative rotation with respect to the pipe. Accordingly, it is no longer necessary to have a separate support for a 2 inch pipe and a separate support for a 2½ inch pipe.

The radius of curvature for the arcuate portion of clamp 36 is 1¼ inches. Hence, support 10 contacts about 320° of the circumference of pipe 12' whereas it contacts about 280° of the circumference of pipe 12. As a result of such circumferential contact and the set screws, support 10 has great resistance to relative rotation with respect to pipes 12 and 12'.

The cross arm 14 and clamp 36 may be made of low carbon steel. The cross arm 14 is preferably about 2 inch wide and clamp 36 about 1 inch wide. Clamp 36 preferably has a thickness of about ¼ inch while cross arm 14 is preferably made from sheet stock about 0.07 inches thick. These dimensions are exemplary of a working embodiment.

The present invention may be embodied in other specific forms without departing from the spirit or essential attributes thereof and, accordingly, reference should be made to the appended claims, rather than to the foregoing specification as indicating the scope of the invention.

We claim:

1. A cross arm hanger support adapted to be attached to a horizontally disposed gym set pipe comprising
   a. a cross arm having portions converging upwardly from free ends to an apex, said cross arm having generally semi-circular lower edges adjacent and below the apex thereof, each of said portions including a top wall having a hole therein, each of said holes being elongated in a direction towards said apex,
   b. a clamp having a flange at each end of a centrally disposed arcuate portion, each flange being generally parallel to one of said top walls, each flange having a hole aligned with one of said holes in said top walls, a bolt for each set of aligned holes,
   c. at least one set screw supported by said cross arm adjacent the apex thereof, at least one set screw supported by said clamp, said set screws being adapted to contact the OD of a pipe to prevent relative rotation of the arm and clamp with respect to the pipe,
   d. means at the free ends of said portions for rotatably supporting a hanger, and
   e. said cross arm lower edges having one or more arcuately spaced slits extending radially outwardly from said lower edges to permit the lower edges to accommodate and conform to a pipe having an OD of about 2 inches to 2½ inches.

2. A support in accordance with claim 1 wherein said top walls converge toward the apex with the included angle being approximately 90°, and said lower edge having an arcuate length of about 180°–195°.

3. A support in accordance with claim 1 wherein said clamp has two set screws arcuately spaced from one another along said central arcuate portion for a distance of between 60° and 120°.

4. A support in accordance with claim 1 wherein each of said set screws is of the self tapping type and extend generally toward one another.

5. A support in accordance with claim 1 wherein the diameter of said lower edges is approximately 2 inches, and said edges having at least two slits to facilitate expansion of the diameter of said edges up to 2½ inches.

6. A support in accordance with claim 1 wherein the radius of curvature of said arcuate portion of said clamp is greater than the radius of curvature of said lower edges.

* * * * *